(12) United States Patent
Bauer et al.

(10) Patent No.: US 12,261,564 B2
(45) Date of Patent: Mar. 25, 2025

(54) METHOD FOR OPERATING A DC MOTOR

(71) Applicant: Conti Temic microelectronic GmbH, Ingolstadt (DE)

(72) Inventors: Beat Bauer, Friedrichshafen (DE); Frank Faha, Constance (DE); Erwin Kessler, Saulgau (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 63 days.

(21) Appl. No.: 18/038,868

(22) PCT Filed: Nov. 9, 2021

(86) PCT No.: PCT/DE2021/200184
§ 371 (c)(1),
(2) Date: May 25, 2023

(87) PCT Pub. No.: WO2022/111772
PCT Pub. Date: Jun. 2, 2022

(65) Prior Publication Data
US 2024/0030845 A1    Jan. 25, 2024

(30) Foreign Application Priority Data
Nov. 25, 2020 (DE) .................. 10 2020 214 810.4

(51) Int. Cl.
*H02P 27/08* (2006.01)
*H02P 7/03* (2016.01)
(Continued)

(52) U.S. Cl.
CPC . *H02P 7/29* (2013.01); *H02P 7/04* (2016.02)

(58) Field of Classification Search
CPC .... H02P 7/04; H02P 7/29; H02P 23/30; H02P 23/14; H02P 23/26; H02P 27/08
(Continued)

(56) References Cited

U.S. PATENT DOCUMENTS 5,017,854 A * 5/1991 Gully .................... F04B 35/045
                                                    318/599
5,428,522 A * 6/1995 Millner ............. H02M 7/53871
                                                    363/63
(Continued)

FOREIGN PATENT DOCUMENTS

| DE | 102008040793 A1 | 2/2010 |
| EP | 2149977 A2 | 2/2010 |
| JP | S6032594 A | 2/1985 |

OTHER PUBLICATIONS

Office Action dated Sep. 17, 2021 from corresponding German patent application No. 10 2020 214 810.4.
(Continued)

*Primary Examiner* — Gabriel Agared

(57) ABSTRACT

Method for operating a DC motor, where the DC motor is supplied with a variable DC voltage via a bridge circuit from a supply voltage and formed by a first, a second, a third and a fourth controllable switch, wherein the DC voltage is varied by pulse width modulation of the control signals driving the controllable switches of the bridge circuit. A control arrangement drives the bridge circuit by pulse width modulation, after the first switch connecting the DC motor to the supply voltage has been switched off, switches on the second switch connected to a ground terminal, or vice versa. The control arrangement automatically inserts a drive pause between the first or second switch being switched off and the second or first switch being switched on, whereby a bridge circuit voltage present at the DC motor is limited by a resultant maximum settable duty cycle to a maximum value.

6 Claims, 8 Drawing Sheets

Figure 1:
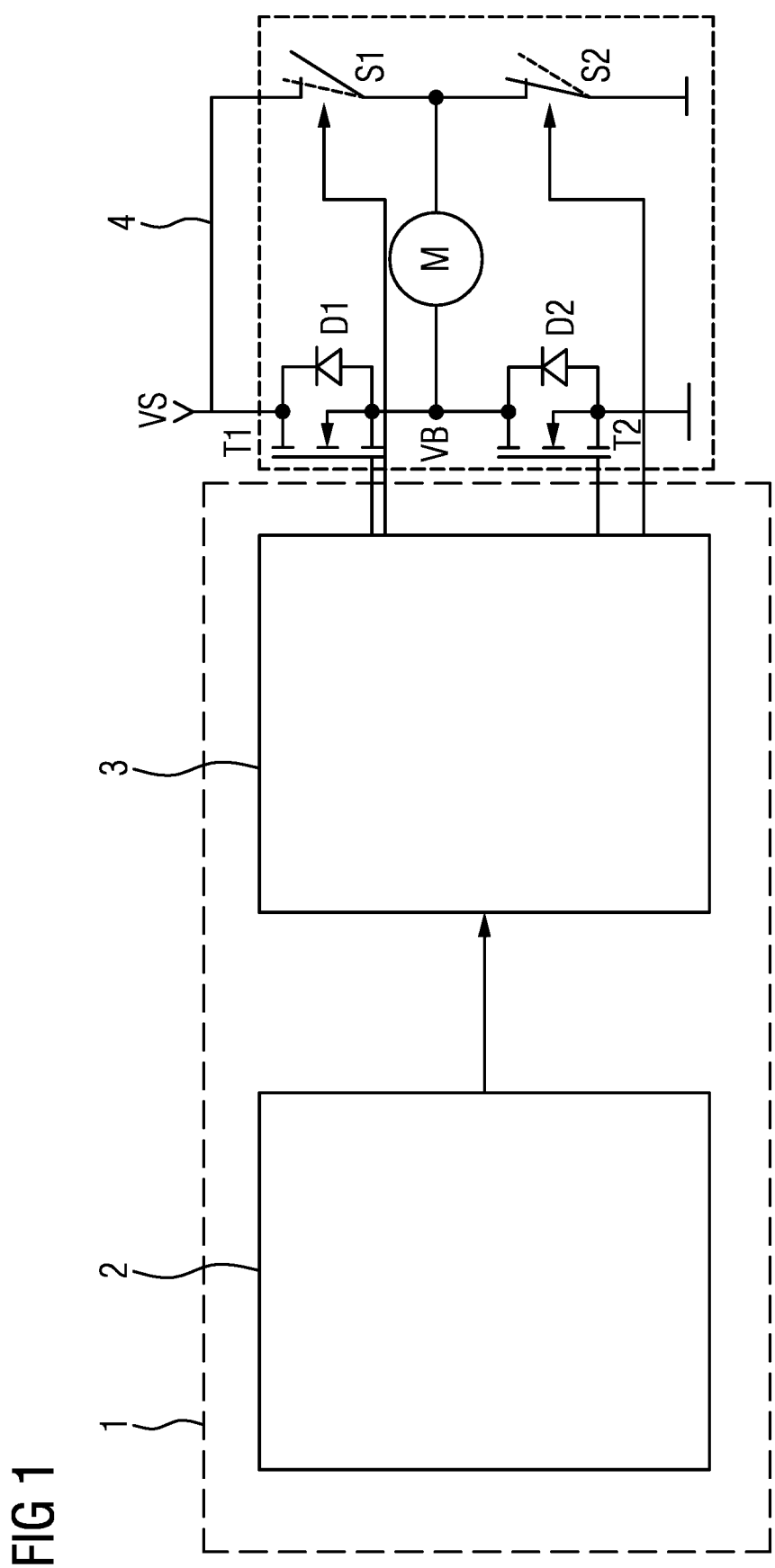

(51) Int. Cl.
  *H02P 7/29* (2016.01)
  *H02P 23/14* (2006.01)
  *H02P 23/30* (2016.01)
(58) Field of Classification Search
  USPC .................................................. 318/400.26
  See application file for complete search history.

(56) References Cited

U.S. PATENT DOCUMENTS

| | | |
|---|---|---|
| 7,079,589 B1 | 7/2006 | Maksimovic et al. |
| 7,112,937 B1* | 9/2006 | Stemple .................... H02P 7/29 |
| | | 318/504 |
| 8,174,248 B2 | 5/2012 | Mavencamp et al. |
| 9,853,588 B2 | 12/2017 | Green et al. |
| 10,576,828 B2 | 3/2020 | Thongam et al. |
| 2014/0340008 A1* | 11/2014 | Reynolds ................ H02P 6/182 |
| | | 318/400.11 |
| 2016/0218648 A1* | 7/2016 | Hijikata .................... H02P 8/12 |
| 2016/0315570 A1* | 10/2016 | Hayashi .................... H02P 7/04 |
| 2016/0373046 A1* | 12/2016 | Suzuki ...................... H02P 3/22 |
| 2017/0025972 A1* | 1/2017 | Tsai .......................... H02P 7/04 |
| 2020/0366224 A1* | 11/2020 | Bastholm ................. H02P 5/46 |

OTHER PUBLICATIONS

International Search Report and Written Opinion dated Feb. 3, 2022 from corresponding International Patent application No. PCT/DE2021/200184.
Notice of Allowance issued Jan. 10, 2025 from corresponding Korean patent application No. 10-2023-7014131.

* cited by examiner

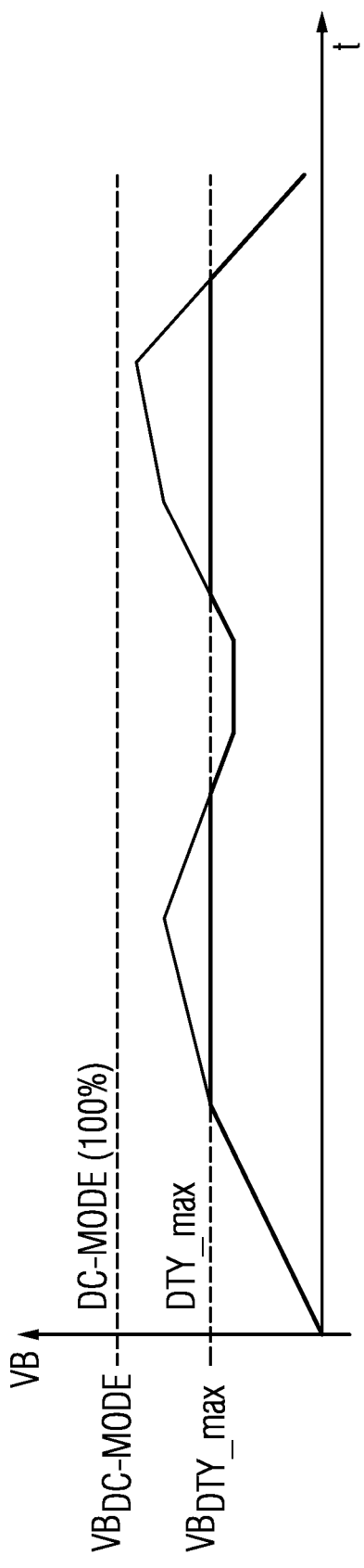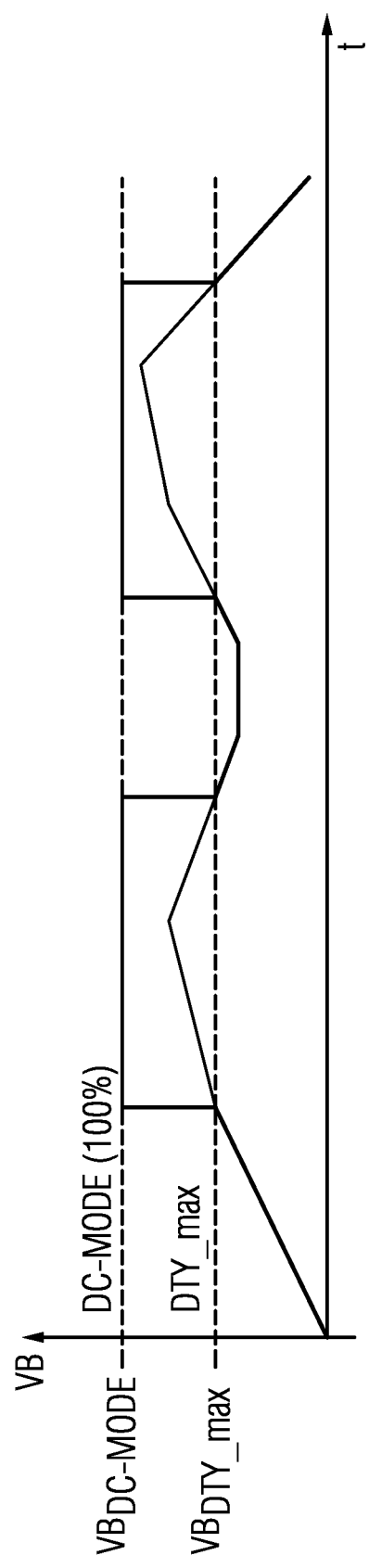

METHOD FOR OPERATING A DC MOTOR

The invention relates to a method for operating a DC motor, in which the DC motor is supplied with a variable DC voltage via a bridge circuit fed from a supply voltage and formed by a first, a second, a third and a fourth controllable switch, wherein the DC voltage is varied by pulse width modulation of the control signals driving the controllable switches of the bridge circuit, and in which a control arrangement drives the bridge circuit by pulse width modulation, which control arrangement, after the first switch connecting the DC motor to the supply voltage has been switched off, switches on the second switch connected to a ground terminal, or vice versa.

Switches in the form of semiconductor output stages driven by pulse width modulation are increasingly being used for controlling the power or regulating the speed of DC motors. In pulse-width-modulated operation, the DC motor is supplied with a pulse-pause-modulated or pulse-width-modulated voltage. The pulse width modulation frequency is generally above 15 kHz in "small motor applications". Often a constant period duration (constant frequency) is chosen and the time duration during which the pulse-width-modulated drive signal has an "on" state varies. The ratio between the duration of the "on" state and the period duration is referred to as the duty cycle. In this case, the duty cycle can theoretically be set between 0% and 100%. The average value of the "on" time duration and the "off" time duration determines the percentage of the supply voltage which is applied to the DC motor for the operation thereof.

Freewheeling is required during the clocked switching of inductive loads such as e.g. motors. There are two possibilities when realizing said freewheeling: passive freewheeling or active freewheeling.

Passive freewheeling is generally realized using a diode which ensures that the current can continue to flow through the motor after the switch, usually realized as a field effect transistor, has been turned off. Passive freewheeling has the disadvantage of a high power loss in the freewheeling diode.

In the case of active freewheeling, the freewheeling diode is bridged by a switching transistor/field effect transistor during the freewheeling phase, which makes it possible to reduce the power losses in the freewheeling phase. In the case of active freewheeling, the drive logic for the field effect transistors has to ensure that the two switches or field effect transistors connected in series between the poles of the supply voltage are never switched on simultaneously.

The field effect transistors usually used as switches here have substrate diodes, and so with the transistor switched off, the substrate diode connected in parallel has a freewheeling function, although with the higher power loss mentioned above.

Figure 2:
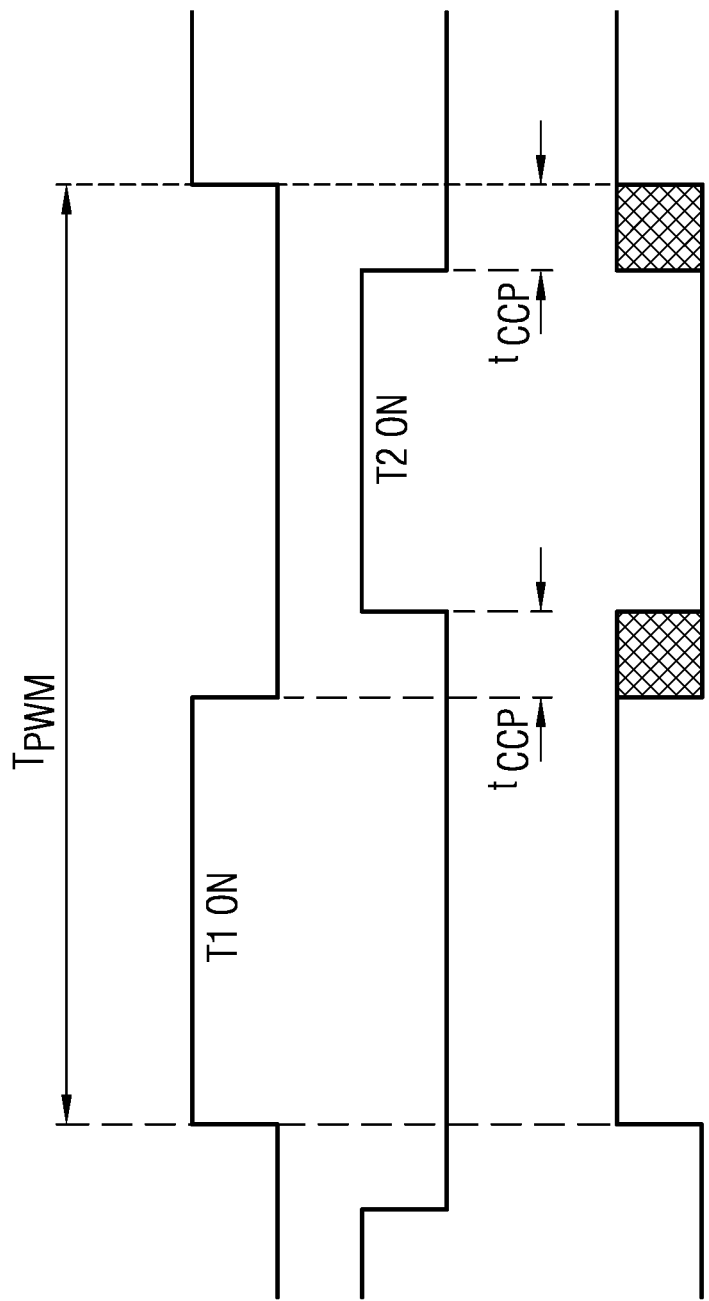

This is usually implemented by a drive pause tCCP being inserted between the switch-on phases of the switch supplying the motor with the supply voltage and the switch-on phases of the freewheeling switch, both switches being switched off in said drive pause. In the technical literature this phase is often referred to as Cross Current Protection Time. The drive pause tCCP is illustrated in FIG. 2.

Particularly in the case of simple drive logics/drive components for controlling the switches, it may be necessary that said drive pause tCCP must be chosen to be very large in order to ensure, across all component tolerances, protection against a short-circuit current via both switches connected in series.

Figure 3:
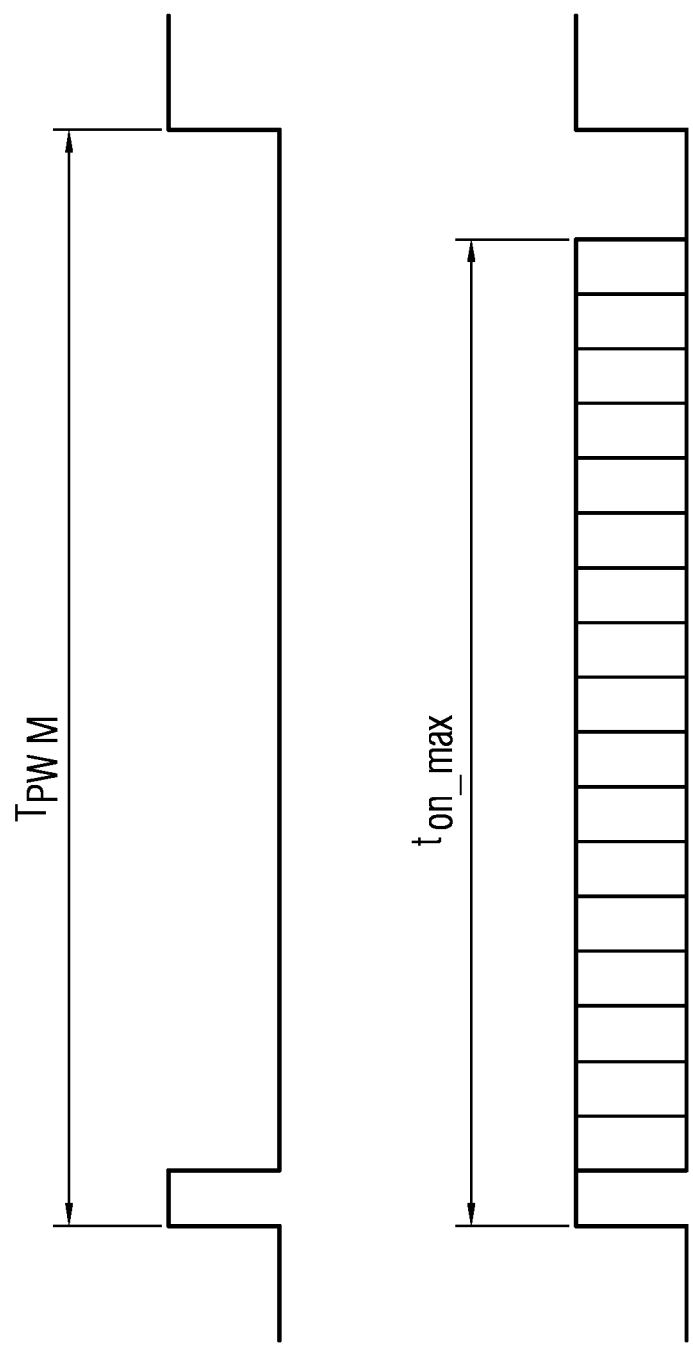

In accordance with FIG. 3, this results in a maximum duty cycle, however, which ultimately leads to a maximum percentage of the supply voltage with which the DC motor can be supplied in the case of this drive method.

Particularly in automotive applications with a wide battery voltage range of approximately 7V-16V, in the case of low supply voltages this may have the effect that not enough voltage is available at the DC motor. This problem can be avoided if, when the output duty cycle actually required has to be exceeded, the control electronics change over from the pulse width modulation mode to a DC mode, in which the supply voltage is permanently applied to the motor. This is depicted schematically in FIG. 5. However, the resultant voltage jumps give rise to regulation problems.

The object of the invention is therefore to provide a remedy here.

The object is achieved by means of a method as claimed in claim 1. Advantageous developments are specified in the dependent claims.

Accordingly, in a method for operating a DC motor, in which the DC motor is supplied with a variable DC voltage via a bridge circuit fed from a supply voltage and formed by a first, a second, a third and a fourth controllable switch, wherein the DC voltage is varied by pulse width modulation of the control signals driving the controllable switches of the bridge circuit, a control arrangement drives the bridge circuit by pulse width modulation, which control arrangement, after the first switch connecting the DC motor to the supply voltage has been switched off, switches on the second switch connected to a ground terminal, or vice versa. The control arrangement automatically inserts a drive pause between the first or second switch being switched off and the second or first switch being switched on, as a result of which a bridge circuit voltage present at the DC motor is limited by a resultant maximum settable duty cycle to a maximum value, which is less than the supply voltage, and in this case the control arrangement can also be switched over into a DC mode in which the DC motor is supplied with the supply voltage. The control arrangement has a control unit, which generates a drive signal in predefined control time durations, said drive signal containing information about a duty cycle of the pulse-width-modulated signal or a supply voltage for the DC motor proportional thereto, wherein a control time duration is a multiple of a period duration of a pulse-width-modulated control signal, wherein for the case where the bridge circuit voltage to be set for the DC motor is greater than the voltage resulting from the maximum value of the duty cycle, the control unit, during a predefinable drive time duration, which is a multiple of the control time durations, drives a first number of control time durations, in which the bridge circuit is operated with a pulse-width-modulated signal with a maximum duty cycle, and a second number of control time durations, in which the bridge circuit is operated in the DC mode, wherein the ratio of the first number and the second number of control time durations is derived from the difference value between the bridge circuit voltage to be set and the voltage corresponding to the maximum value.

In other words, in the time interval during which the supply voltage required for controlling the motor is greater than is possible by way of the maximum duty cycle of the pulse-width-modulated control signal, a superposed pulse width modulation is realized which includes phases with the voltage resulting from the maximum value of the duty cycle and phases with the supply voltage. The ratio of the time durations of these phases then determines an average voltage which can be adapted to the required supply voltage with fine granularity.

In one advantageous embodiment of the method according to the invention, the control unit is formed with a microprocessor, and a circuit arrangement driving the bridge circuit is formed with an integrated circuit.

The properties of the integrated circuit are defined, which gives rise to the problem of the voltage jump in the course of switching over into the DC mode. The integrated circuit can advantageously be utilized in a simple manner by means of the method according to the invention.

In one development of the method, the control time durations of the first number of control time durations, in which the bridge circuit is operated with a pulse-width-modulated signal with a maximum duty cycle, and control time durations of the second number of control time durations, in which the bridge circuit is operated in the DC mode, succeed one another alternately within a drive time duration.

If the first and second numbers were identical, a fundamental would arise and might lead to humming. In order to reduce this fundamental component, the pulse-width-modulated and the DC-mode control time durations are now distributed within a fundamental period. A uniform distribution is possible, but other distribution patterns are also conceivable.

Figure 6:
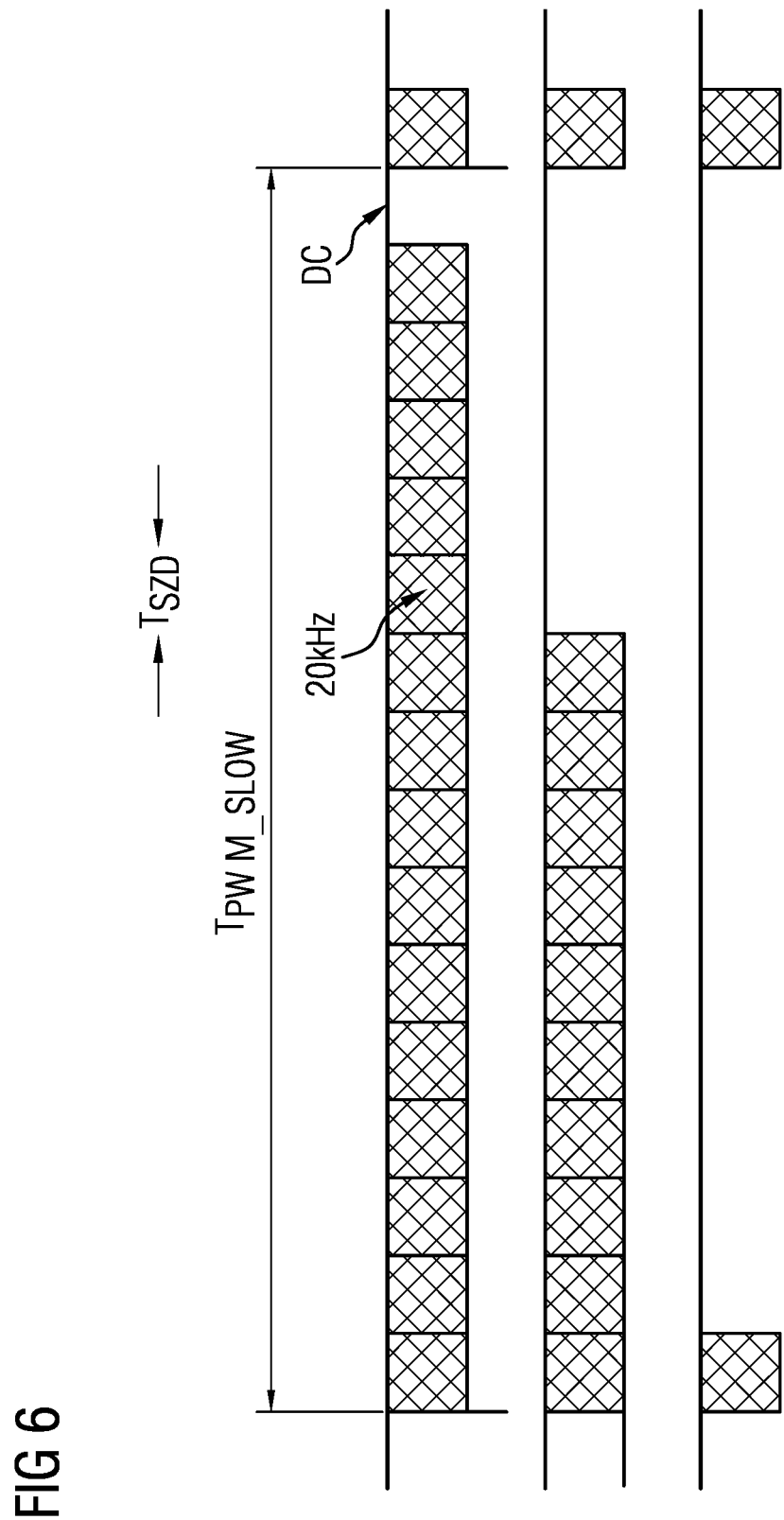
Figure 7:
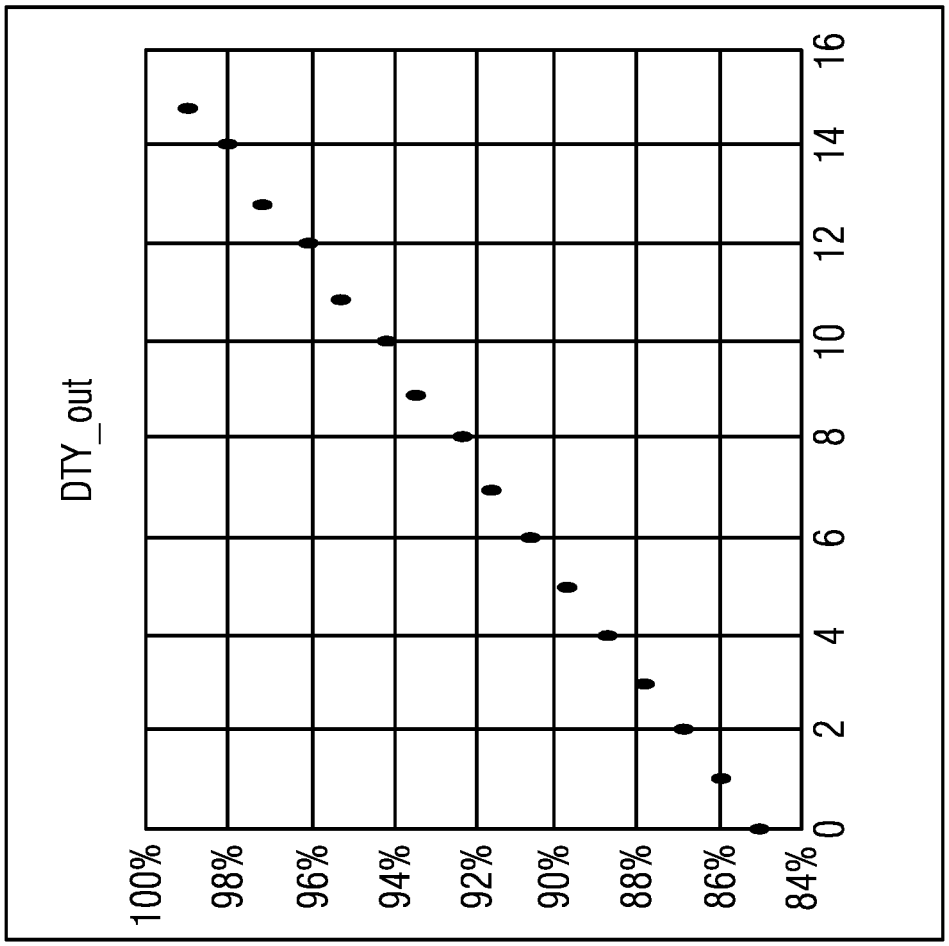
Figure 8:
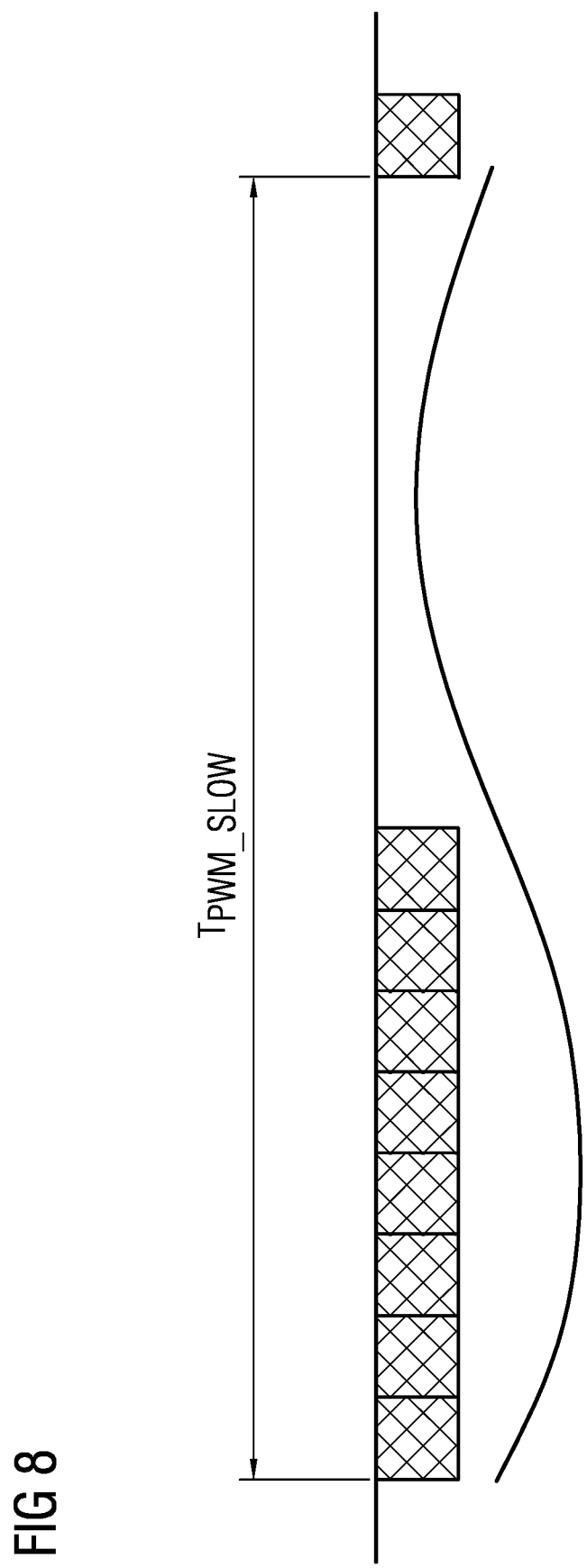
Figure 9:
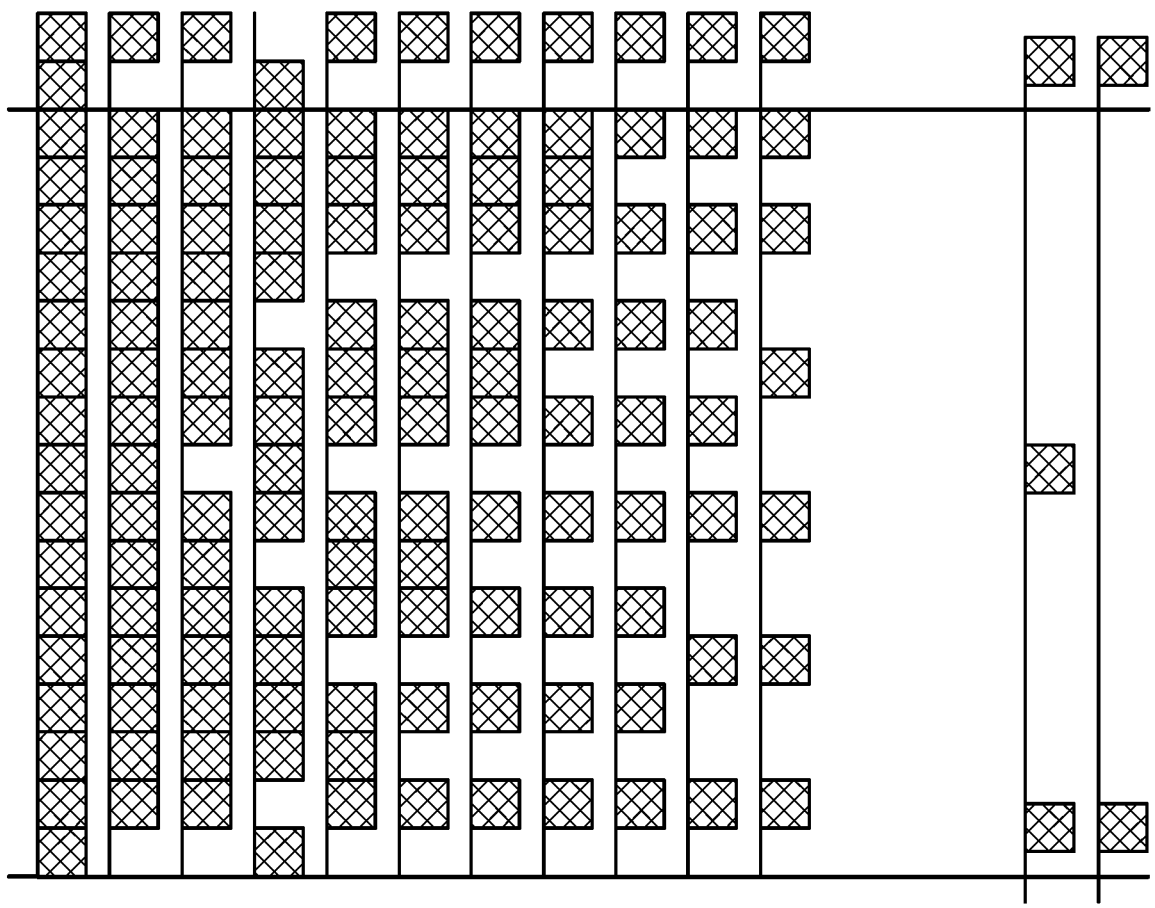

The invention is described in greater detail below on the basis of exemplary embodiments with the aid of figures. In the figures:

FIG. 1 shows a basic circuit diagram with a control arrangement, a bridge circuit and a DC motor, FIG. 2 shows signal profiles for illustrating the drive pauses, FIG. 3 shows signal profiles for illustrating the maximum duty cycle, FIG. 4 shows the signal profile for illustrating the maximum voltage in pulse width modulation, FIG. 5 shows the signal profile for illustrating the switching over between the maximum voltage in pulse width modulation and the voltage in the DC mode, FIG. 6 shows the signal profile for illustrating the superposed slow pulse width modulation, FIG. 7 shows a table for illustrating the possible granularity, FIG. 8 shows an illustration in the case of unequally distributed phases with pulse-width-modulation and phases in the DC mode for elucidating the fundamental, FIG. 9 shows an illustration in the case of distributed phases with pulse width modulation and phases in the DC mode.

FIG. 1 shows the basic circuit diagram of a drive circuit for a DC motor M, which can be connected to a supply voltage VS via a bridge circuit 4. In the exemplary embodiment illustrated, the bridge circuit 4 here has two half-bridges, each of which is formed with two switches connected in series, the series circuits being connected in parallel with one another. In this case, the first half-bridge is formed with a first switch T1 and a second switch T2 connected in series therewith, which, in the exemplary embodiment illustrated, are realized with field effect transistors having in each case a substrate diode D1 and D2, respectively. The second half-bridge likewise has two switches connected in series, the third switch S1 and the fourth switch S2 merely being indicated schematically. The third and fourth switches S1, S2 can also be formed with field effect transistors having substrate diodes.

By way of example, if the first switch T1 and the fourth switch S2 are switched on, then a current flows from the high potential of the supply voltage VS through the DC motor M to the low potential of the supply voltage VS, which is usually a ground terminal.

If the DC motor M is turned off again by the first switch T1 being switched off, then a current path—a so-called freewheeling path—must be present which makes a current possible such that the magnetic energy stored in the coils of the DC motor M can dissipate again. This can be effected for example via the substrate diode D2 of the second switch T2. However, such substrate diodes D1, D2 have a relatively high on-state resistance, and so a high power loss is generated in this way. It is better for the freewheeling path also to be embodied with a switched element, for example a transistor, which is effected by means of the second switch T2 in the exemplary embodiment illustrated in FIG. 1.

However, the first switch T1 and the second switch T2 must be prevented from being switched on simultaneously, since otherwise the supply voltage VS would be short-circuited.

The switches T1, T2, S1, S2 of the bridge circuit 4 are driven by a circuit arrangement 3, which is preferably realized in an integrated circuit optimized for the operation of bridge circuits 4, for the purpose of controlling DC motors M. Such a circuit arrangement 3 embodied in an integrated circuit only needs to receive a control signal from a control unit 2, preferably formed with a microprocessor or a microcontroller, said control signal specifying the bridge circuit voltage VB which is intended to be set at the DC motor M.

The bridge circuit voltage VB is set by way of a pulse width modulation of the drive signal for either the first switch T1 or, for reverse operation, the second switch T2, such that an average bridge supply voltage VB is established at the DC motor M depending on the duty cycle of said drive signal. The switching frequency for the drive signal of the switches of the bridge circuit 4 is in the range of 15 to 20 kHz in the case of small motors, thus accordingly resulting in a period duration of said drive signal of approximately 50 to 67 µs.

FIG. 2 illustrates a period of such a drive signal for, by way of example, the first transistor T1 of the bridge circuit 4 in the upper signal profile. A period duration TPWM has a first phase T1on, in which the first transistor T1 is switched on, and a second phase, in which said transistor is switched off. During this switch-off phase, a current flows through the motor M and ensures that the magnetic energy in the motor M can dissipate, either through the substrate diode D2 of the second switch T2 or, if the latter is switched on, through the switch T2 itself. This is illustrated in the second signal profile in FIG. 2.

In that case, after the first switch T1 has been turned off, firstly there is a wait during a drive pause tCCP, in which none of the switches is actuated, and then the second switch T2 is switched on during a time duration T2on. There must also be a drive pause tCCP between turning off the second switch T2 and switching the first switch T1 on again, in order that the first and second switches T1, T2 are not simultaneously in the on state, since otherwise, as already explained above, a short-circuit current would flow.

The lower signal profile in FIG. 2 illustrates the voltage VB at the junction point between the first and second transistors T1, T2, which voltage, during a period duration TPWM, firstly during the switch-on time T1on of the first which T1, virtually corresponds to the value of the supply voltage VS and, during the succeeding drive pause tCCP, assumes a floating value and then, during the drive time T2on of the second switch T2, virtually corresponds to the potential of the ground terminal and, finally, during the drive pause tCCP, once again assumes a floating state.

The ratio between the switch-on time T1on of the first switch T1 and the period duration TPWM is usually referred to as the duty cycle and, on the basis of the example of the bridge circuit 4 in FIG. 1, determines the average voltage VB at the DC motor M, said average voltage being established at the junction point between the first and second switches T1, T2. This will be elucidated once again in FIG. 3.

The latter, too, once again illustrates a period of the drive signal for the first switch T1 with a period duration TPWM, the upper signal profile illustrating only a short switch-on time, such that only a low bridge supply voltage VB results from the average value of the time in which the first switch T1 is switched on and the time in which said first switch is switched off. If a significantly longer switch-on time is chosen, as is illustrated in the lower signal profile of the drive signal for the first switch T1, then a significantly higher bridge supply voltage VB correspondingly results. However, the switch-on time cannot be chosen to be equal to the period duration TPWM, since the drive pauses tCCP prevent this. The maximum switch-on time ton_max is correspondingly depicted in the lower signal profile in FIG. 3. This maximum switch-on time for the first switch T1 thus results in a maximum bridge supply voltage VB, which is illustrated in FIG. 4.

FIG. 4 illustrates a drive sequence for the DC motor M in which the motor is firstly switched on and the bridge supply voltage VB is increased until it reaches a maximum voltage VBDTY_max on account of the maximum switch-on time of the first switch T1 in the case of a maximum duty cycle DTY_max.

On account of the request from the control unit 1 (FIG. 1), the bridge supply voltage VB should rise, but that cannot take place on account of the problem outlined above. It is only if the requested bridge supply voltage VB falls below the maximum bridge supply voltage VBDTY_max again that the set voltage can again correspond to the required voltage. This becomes particularly problematic if on account of the circumstances in a motor vehicle with a greatly varying supply voltage VS, the maximum bridge supply voltage VBDTY_max then established is no longer sufficient for operating the DC motor M.

In order to avoid this problem, the circuit arrangement 3 embodied as an integrated circuit is designed, as an alternative to driving the switching transistor T1 by pulse width modulation, to operate said switching transistor in the so-called DC mode, in which the motor M is connected to the supply voltage VS during the entire period duration TPWM. This is illustrated in FIG. 5, the switchover into this DC mode being effected when the maximum duty cycle DTY_max is reached. However, as can be seen from FIG. 5, an abrupt jump results, which leads to problematic regulation conditions.

In order to avoid this problem, in the manner according to the invention, during the time duration in which the required supply voltage for the DC motor M is greater than the maximum bridge supply voltage VBDTY_max possible in pulse-modulated operation, a number of drive time durations TPWM_SLOW are now generated, during which a number Ns of control time durations TSZD succeed one another, either a number of pulse-width-modulated period durations TPWM or switching over into the DC mode being effected during these control time durations TSZD.

This is illustrated in FIG. 6. The latter illustrates in the upper diagram a drive time duration TPWM_SLOW having a number Ns of 16 control time durations TSZD in the example illustrated. In the exemplary embodiment illustrated, this drive time duration TPWM_SLOW has 15 successive control time durations TSZD, which are filled for example with a number of period durations of a signal with 20 kHz in the illustrated example, which have the maximum duty cycle TDY_max. This example illustrates just one control time duration TSZD in the DC mode at the end of the drive time duration TPWM_SLOW.

As an alternative thereto, the middle signal profile illustrates the situation when only a number nDZ equalling 10 successive control time durations TSZD with a maximum duty cycle of the drive signal are effected, while that is followed by six succeeding control time durations TSZD in the DC mode. In the third example, just one control time duration TSZD with pulse-width-modulated period durations is illustrated, while 15 control time durations in the DC mode are illustrated. Correspondingly, the average voltage resulting from this driving would become greater and greater, and so it is evident that as a result of this method the bridge supply voltage VB is nevertheless possible even in the case where exclusively pulse-width-modulated driving is effected.

FIG. 7 illustrates, with the aid of a table and a corresponding diagram, that in the case of a number Ns of 16 control time durations TSZD during a drive time duration TPWM_SLOW, a setting of the resultant duty cycle for the drive time duration can be set in percentage steps.

If the phases of the control time durations TSZD with pulse width modulation and the phases of the control time durations TSZD in the DC mode, as illustrated in FIG. 6 and in FIG. 8, are applied to the first switch T1 of the bridge circuit 4 for a number nDC of 8 in each case in succession, then this results in a periodic drive signal having a fundamental which is at a frequency which is perceptible as unpleasant humming.

In order to avoid this, in one advantageous development of the method according to the invention, as is illustrated in FIG. 9, an arbitrary or, as also illustrated in FIG. 9, an approximately uniform distribution of the phases with pulse width modulation and the phases in the DC mode can be distributed within a control time duration TSZD. In the case of a uniform distribution, although a fundamental can once again arise, this fundamental is in a significantly higher frequency range and has a smaller amplitude.

The invention claimed is:

1. A method for operating a DC motor,
   in which the DC motor is supplied with a variable DC voltage via a bridge circuit fed from a supply voltage and formed by a first, a second, a third and a fourth controllable switch, wherein the DC voltage is varied by pulse width modulation of control signals driving the controllable switches of the bridge circuit,
   in which a control arrangement drives the bridge circuit by pulse width modulation, which control arrangement, after the first switch connecting the DC motor to the supply voltage has been switched off, switches on the second switch connected to a ground terminal, or vice versa, wherein the control arrangement automatically inserts a drive pause between the first or second switch being switched off and the second or first switch being switched on, as a result of which a bridge circuit voltage present at the DC motor is limited by a resultant maximum settable duty cycle to a maximum value, which is less than the supply voltage, and the control arrangement can also be switched over into a DC mode in which the DC motor is supplied with the supply voltage, in which method the control arrangement has a control unit, which generates a drive signal in predefined control time durations, said drive signal containing information about a duty cycle of the pulse-width-modulated signal or a supply voltage for the DC motor proportional thereto, wherein a control time duration is a multiple of a period duration of a pulse-width-modulated control signal, wherein where the bridge circuit voltage to be set for the DC motor is greater than voltage resulting from the maximum value of the duty cycle, the control unit, during a predefined drive time duration, which is a multiple of the control time durations, drives a first number of control time durations, in which the bridge circuit is operated with a pulse-width-modulated signal at a maximum duty cycle, and a second number of control time durations, in which the bridge circuit is operated in the DC mode, wherein a ratio of the first number and the second number of control time durations is derived from a difference value between the bridge circuit voltage to be set and the voltage corresponding to the maximum value.

2. The method as claimed in claim 1, in which the control unit is formed with a microprocessor, and a circuit arrangement driving the bridge circuit is formed with an integrated circuit.

3. The method as claimed in claim 1, in which control time durations of the first number of control time durations, in which the bridge circuit is operated with the pulse-width-modulated signal at the maximum duty cycle, and control time durations of the second number of control time durations, in which the bridge circuit is operated in the DC mode, succeed one another alternately within the predefined drive time duration.

4. The method as claimed in claim 3, in which the control time durations of the first number of control time durations and the control time durations of the second number of control time durations are distributed uniformly within the predefined drive time duration.

5. The method as claimed in claim 2, in which control time durations of the first number of control time durations, in which the bridge circuit is operated with the pulse-width-modulated signal at the maximum duty cycle, and control time durations of the second number of control time durations, in which the bridge circuit is operated in the DC mode, succeed one another alternately within the predefined drive time duration.

6. The method as claimed in claim 5, in which the control time durations of the first number of control time durations and the control time durations of the second number of control time durations are distributed uniformly within the predefined drive time duration.

* * * * *